T. G. AMES.
Ant-Traps.
No. 137,336.          Patented April 1, 1873.
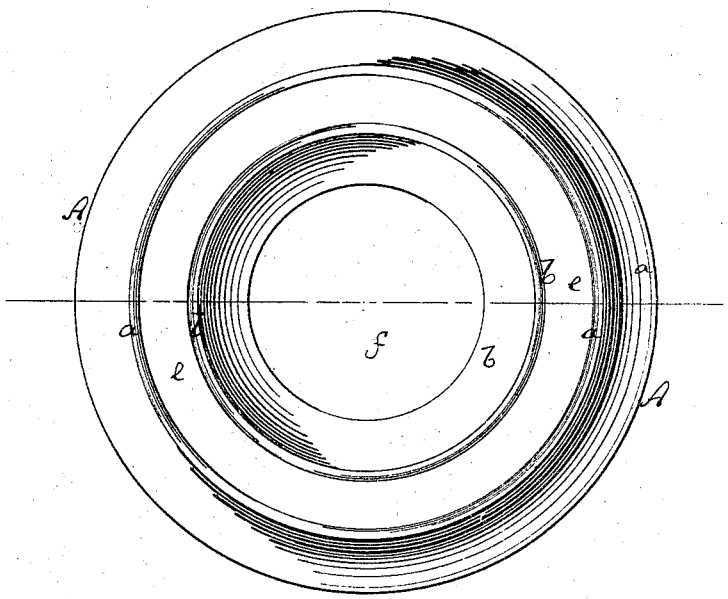
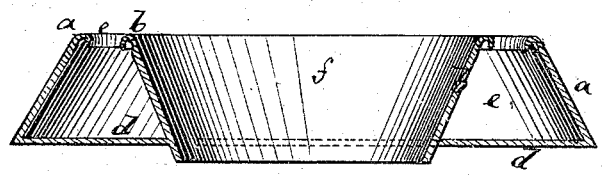

UNITED STATES PATENT OFFICE.

THEODORE G. AMES, OF KOSSE, TEXAS.

IMPROVEMENT IN ANT-TRAPS.

Specification forming part of Letters Patent No. 137,336, dated April 1, 1873; application filed January 6, 1873.

*To all whom it may concern:*

Be it known that I, THEODORE GEORGE AMES, of Kosse, in the county of Limestone and State of Texas, have invented a new and Improved Ant-Trap, of which the following is a specification:

Figure 1 is a top view, and Fig. 2 a central vertical section, of my improved ant-trap.

Similar letters of reference indicate corresponding parts.

This invention relates to a new annular sheet-metal pan arranged so that it can be used advantageously for the purpose of catching ants, and whose double ledges or rings are so made that when it is properly secured upon or in the ground it will collect and retain all the ants that may approach it from within or without.

In the drawing, the letter A represents my improved annular ant-trap. It consists of two vertical or slightly-inclined ledges or rings, $a$ $b$, which are connected by a flat bottom, $d$, as shown, and which form an annular chamber, $e$, between them and a circular chamber, $f$, within $b$. The part $b$ is slightly extended downward below the bottom $d$ to obtain a firm hold in the ground.

In use this trap is placed upon the ground over and around an ant-hill, and earth is piled around to reach nearly or quite to the upper edge of $a$. Within the trap moist soil is by preference piled to the top edge of $b$, the moisture being for the purpose of not choking the entrances into the ant-hill. All ants that may attempt to reach the entrance to the hill may, or will, pass over the upper edge $a$ and drop into the annular chamber $e$, and all those attempting to leave the hill will pass into the same chamber over the edge of $b$. On the smooth metallic inner faces of these plates $a$ $b$ ascent will be impossible to the animals, and they therefore will be securely caught and retained.

I prefer to form projecting lips or ribs on the upper edges of the plates $a$ $b$, toward the interior of the chamber $e$, to insure the impossibility of escape.

Having thus described my invention, I claim as new and desire to secure by Letters Patent—

An ant-trap, consisting of the conical outer vessel $a$, converging toward the top on the inside, and the inner conical vessel $b$, diverging toward the top on the outside, the two being connected by the bottom $d$, as and for the purpose set forth.

THEODORE GEORGE AMES.

Witnesses:
 A. F. MCKISSACK,
 A. D. CALVIN.